United States Patent [19]

Flagg

[11] 4,324,069
[45] Apr. 13, 1982

[54] PLANT GROWING SYSTEM UTILIZING PNEUMATIC PRESSURE

[76] Inventor: Rodger H. Flagg, 1415 Lynn Ave., Fort Wayne, Ind. 46805

[21] Appl. No.: 153,041

[22] Filed: May 27, 1980

[51] Int. Cl.³ .............................................. A01G 31/02
[52] U.S. Cl. .......................................... 47/62; 47/83
[58] Field of Search .............................. 47/39, 79–81, 47/59–64, 83

[56] References Cited

U.S. PATENT DOCUMENTS

| | | | |
|---|---|---|---|
| 2,453,906 | 11/1948 | Hamlet | 47/79 X |
| 2,870,574 | 1/1959 | Sheridan | 47/62 |
| 2,983,076 | 5/1961 | Merrill | 47/59 |
| 3,323,253 | 6/1967 | Robins | 47/62 |
| 3,451,162 | 6/1969 | Rasmussen | 47/62 |

Primary Examiner—Robert E. Bagwill
Attorney, Agent, or Firm—Rodger H. Flagg

[57] ABSTRACT

A method and apparatus for periodically supplying liquid to the root system of plants, utilizing pneumatic pressure to displace liquid in a chamber located beneath a plant support to a higher level accessible to the plant root system; and a means to release the pneumatic pressure in the chamber, allowing the liquid to re-enter the chamber, lowering the liquid to a level below the plant support. This system provides: cyclic feeding of liquid to plant roots; agitation and oxygenation of the liquid during use; re-use of chemically enriched liquid; flexibility in spacing plants during growth cycle, and provides for growing plants in individual containers for ease of handling and transport.

16 Claims, 17 Drawing Figures

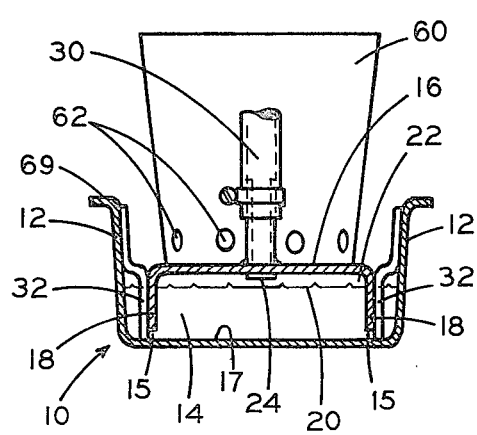
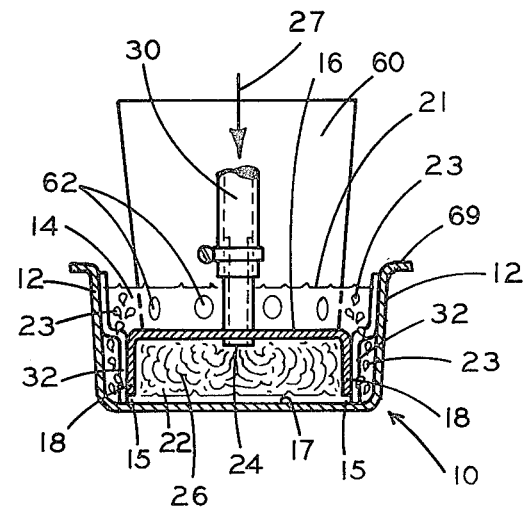
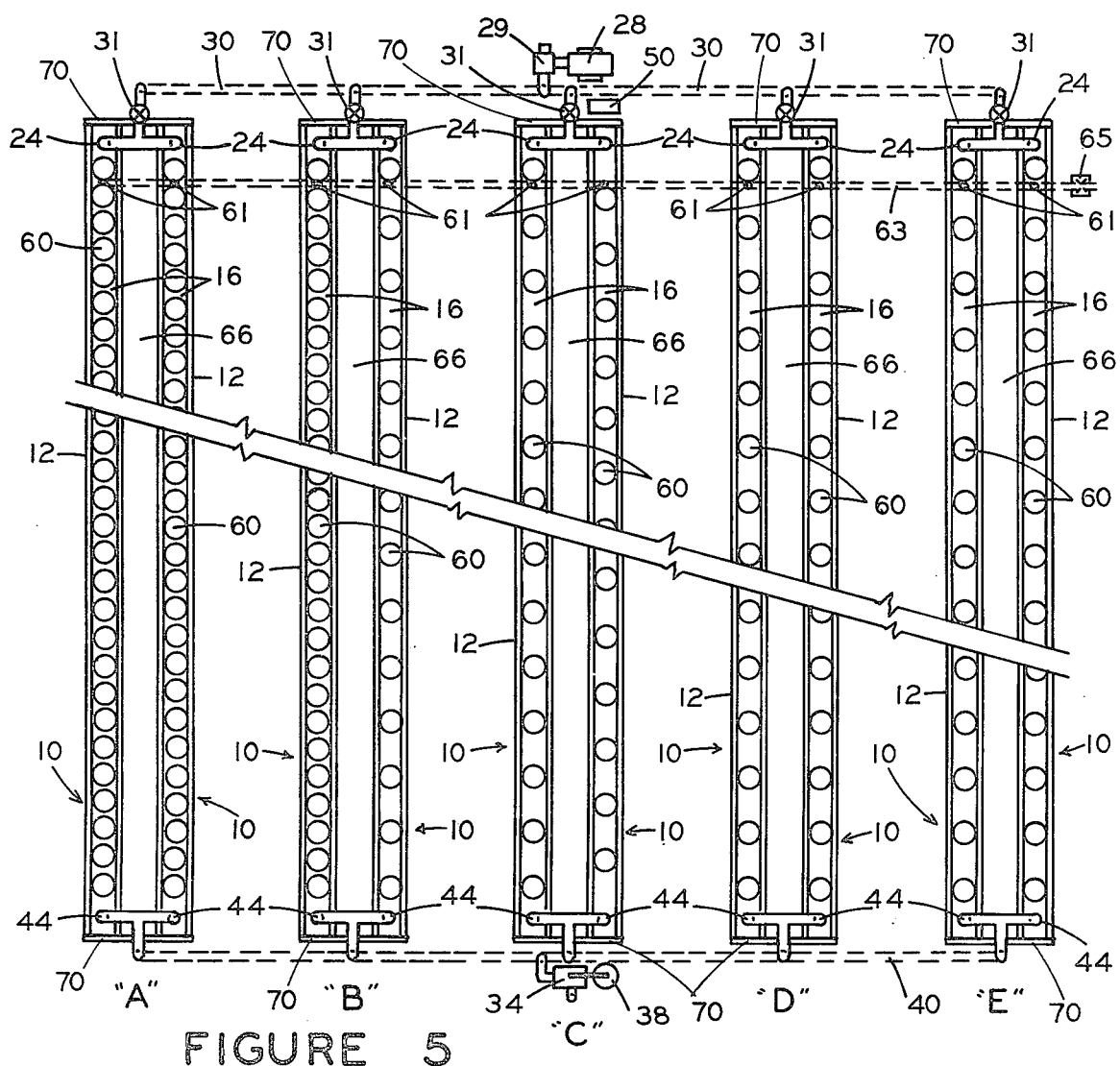

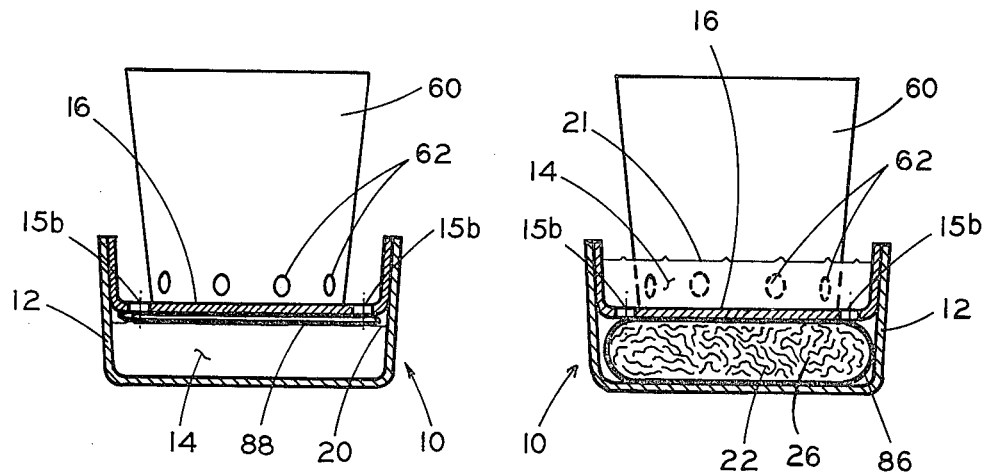
FIGURE 13
FIGURE 14
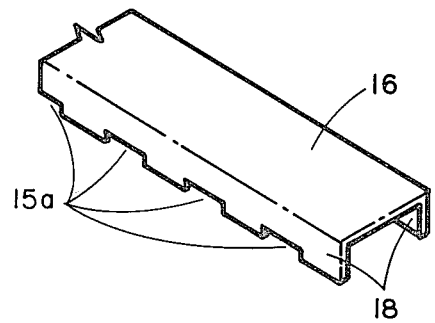
FIGURE 15
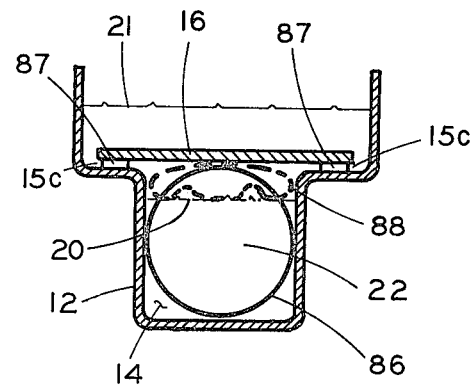
FIGURE 16
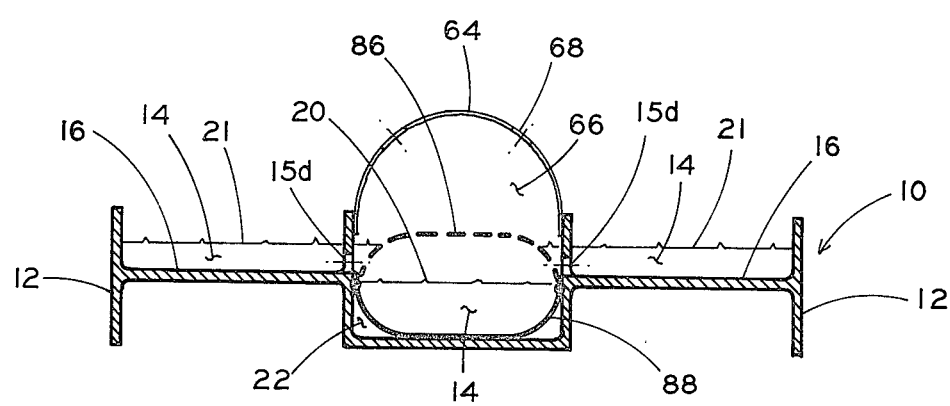
FIGURE 17

PLANT GROWING SYSTEM UTILIZING PNEUMATIC PRESSURE

BACKGROUND OF THE INVENTION

Hydroponics, the science of feeding a balanced nutrient solution of macro and micro nutrients to plants to promote rapid growth and high yields, has proved to be successful in both laboratory and field use. There are two methods for supplying the enriched nutrient solution to plants that dominate the current hydroponic market:

Method "A" utilizes a holding pit for the enriched liquid, and pumps the liquid to the far end of a growing tray, and the liquid returns to the holding pit by gravity flow through an inert medium in which the plants have been rooted.

Method "B" mixes the nutrient with water, pumping the enriched liquid through tubes in which small holes have been provided to release the liquid in the vicinity of the plants.

Both methods of supplying the enriched liquid to the plants have inherent disadvantages:

Method "A" takes up excessive valuable greenhouse space for the liquid holding pit; the nutrient in the liquid solution tends to settle in the pit between use; the flooded trays tend to leach out the heavier nutrients first, resulting in an uneven distribution of enriched liquid to the plants; and, the plants must be uprooted from the planting medium to be moved.

Method "B" provides no means of retrieval of the excess enriched liquid; the liquid is top-fed, which increases the hazards of overwatering; the small holes in the supply tubes easily clog, providing uneven distribution of the liquid; and, the tap water is often far cooler than room temperature, tending to shock the delicate plant roots upon application, thus stressing the plants.

SUMMARY OF THE INVENTION

An important object of the invention is to utilize more efficiently the limited space within a greenhouse.

Another object of the present invention is to provide a means of storing enriched liquid at the point of use, thus eliminating the space required for a large liquid storage tank, while providing for reuse of the enriched liquid.

Another object of the present invention is to agitate and thereby evenly distribute the nutrients within the enriched liquid during the liquid supply cycle.

Another object of the present invention is to provide a novel means of efficient circulation of air around and through the spacings between plants to minimize dangers of plant transpiration breeding fungus and mold diseases in a greenhouse environment.

A further object of the present invention is to provide a means to automatically control the liquid supply cycle in a bottom watering system, thus eliminating the dangers of overwatering.

Still another object of the present invention is to provide flexibility in spacing of plants to maximize use of greenhouse space, without requiring adjustment to the growing system.

Yet another object of the present invention is to supply the enriched liquid to the plants at room temperature, to eliminate shocking the delicate plant roots with cold water. An important feature of the present invention is the usage of a bottom feeder system in which there is a positive displacement of nutrient solution supplied in a metered or controlled amount of such feeder solution to the root structure of a plant in a manner obviating both overfeeding and underfeeding.

DESCRIPTION OF DRAWINGS

FIG. 3 is a cross-sectional view of a growing system showing the liquid level in the growing system prior to a liquid supply cycle.

FIG. 4 is a cross-sectional view of a growing system showing the liquid level in the growing system during the liquid supply cycle.

FIG. 5 is a top view of the side-by-side growing system showing various spacing of potted plants along the plant supports.

FIG. 13 is a cross-sectional view of a growing system utilizing a tube for liquid displacement, shown deflated.

FIG. 14 is a cross-sectional view of a growing system as shown in FIG. 13, with tube inflated to displace liquid.

FIG. 15 is a cross-section of the plant support showing openings for liquid to pass through when pneumatic fluid under pressure is applied to chamber.

FIG. 16 is a cross-sectional view of a growing system using an inflated tube to displace liquid, wherein spacers between plant support and open container provide for passage of liquid during displacement.

FIG. 17 is a cross-sectional view of a pair of growing systems using a bladder located between the plant supports to displace the liquid during cyclic supply of liquid.

DETAILED DESCRIPTION OF THE INVENTION

Figure 1:
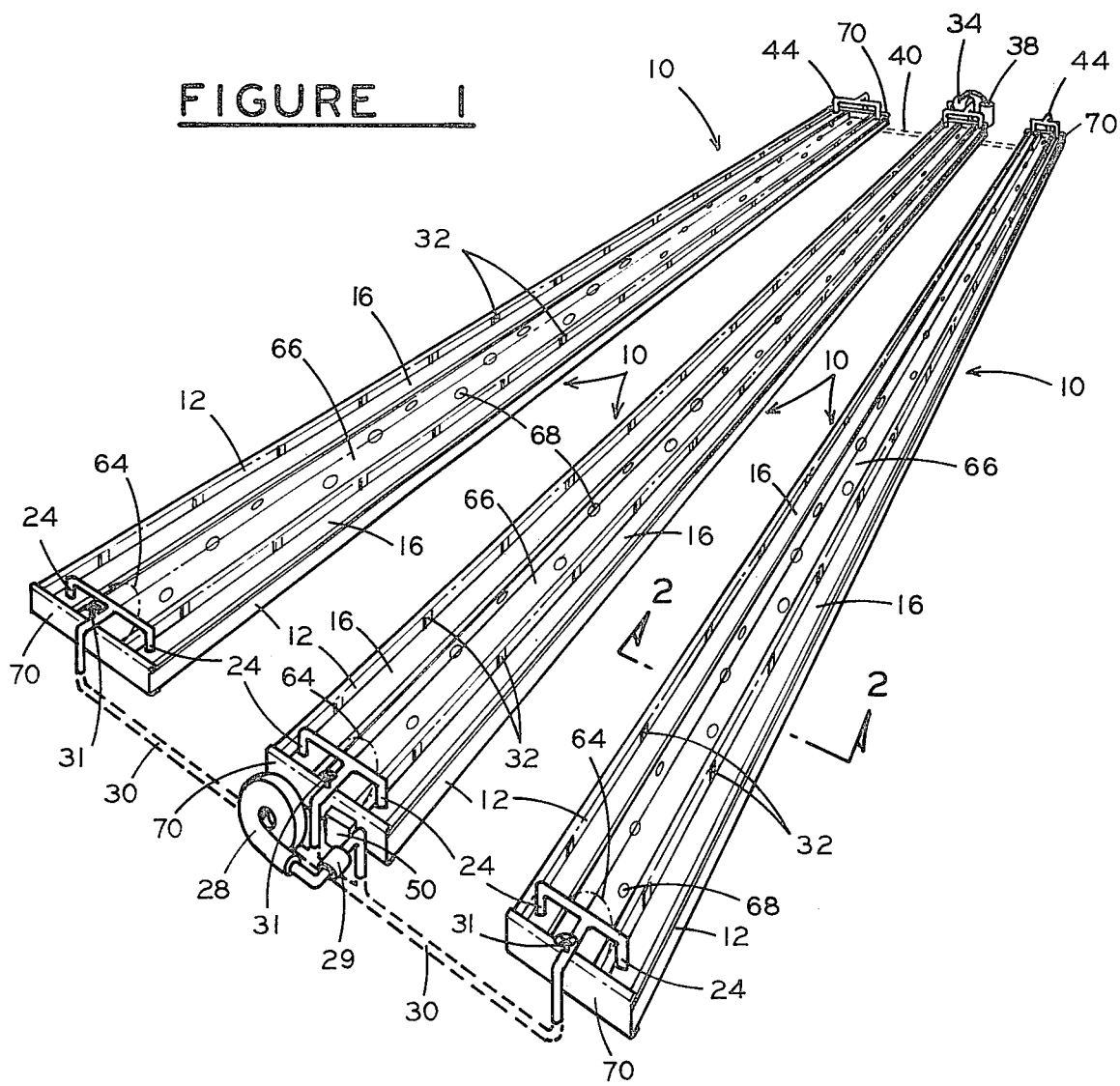
FIG. 1 is a perspective view of the side-by-side growing systems, showing general configuration including provision for air movement between plants.
Figure 2:
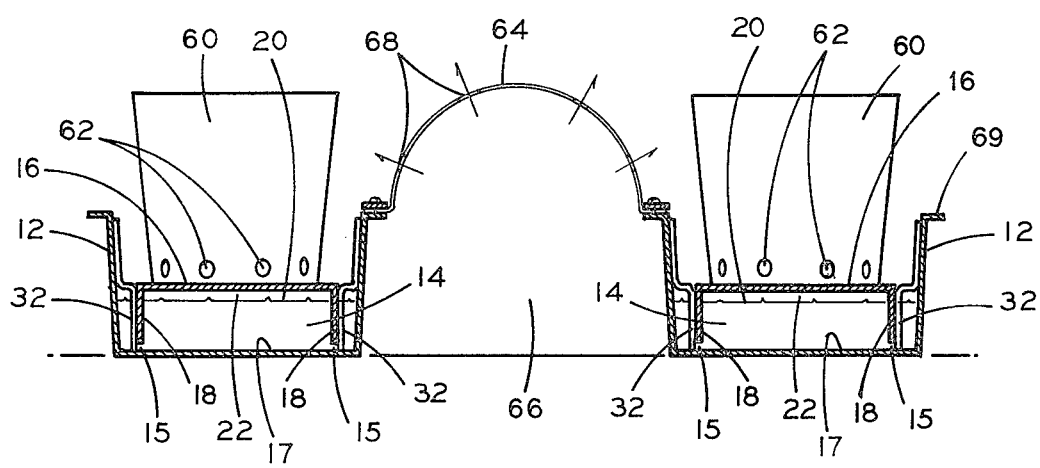
FIG. 2 is a cross-sectional view of the side-by-side growing system, taken along lines 2—2 in FIG. 1.

Referring to FIGS. 1–4, the growing system, designated generally by reference numeral 10, consists of an elongated open container 12, for holding liquid 14, above which is secured an elongated planar plant support 16, having sides 18 depending from the longitudinal edges of support 16. Sides 18 extend below the liquid level 20, forming an inverted U-shaped channel which together with ends 70 of container 12 form chamber 22. An inlet 24 is provided for receiving pneumatic fluid 26 under pressure, within chamber 22. The pneumatic fluid 26 flows from a pneumatic pump 28 and travels through connecting fluid lines 30 to inlet 24. A number of chambers 22 may be supplied by the same pneumatic pump 28.

A normally open pneumatic valve 29 (FIG. 6) is located between fluid line 30 and pneumatic pump 28. This pneumatic valve 29 closes when the pneumatic pump 28 is actuated, allowing pneumatic fluid 26 to be pumped into chamber 22 under pressure, and opens when pneumatic pump 28 is turned off, allowing the pneumatic fluid to escape from chamber 22.

A pneumatic flow control valve 31 may be included between fluid line 30 and each inlet 24 to balance pneumatic flow to each growing system(s) 10.

A continuous longitudinal clearance 15 is provided between the lower edge of each of the extended sides 18 of the plant support 16 and the inner surface 17 of the open container 12 to allow the liquid 14 to pass beneath sides 18 and between the facing surfaces of sides 18 and the sides of container 12 into the open container 12 when pneumatic fluid 26 enters chamber 22 under pressure.

The sides of plant support 16 are secured to the sides of open container 12 either by straps 32 spaced along the length of the growing system 10 to provide clearances 15 as shown in FIGS. 1,4; or, the lower edges of sides 18 of plant support 16 may be secured directly to the open container 12 by adhesive, welding, or conventional fasteners so that the plant support does not float when pneumatic pressure is supplied to chamber 22. When the plant support 16 is so directly secured, longitudinally spaced openings 15a must be provided below the liquid level 20, preferably close to adjacent surface 17, to allow fluid to escape from chamber 22 when pneumatic pressure 26 is added to chamber 22 (FIG. 15).

The chamber 22 is of a size sufficient to allow the liquid 14 to rise above the level of the plant support 16, when the liquid 14 in chamber 22 is displaced by pneumatic fluid 26 under pressure.

Figure 6:
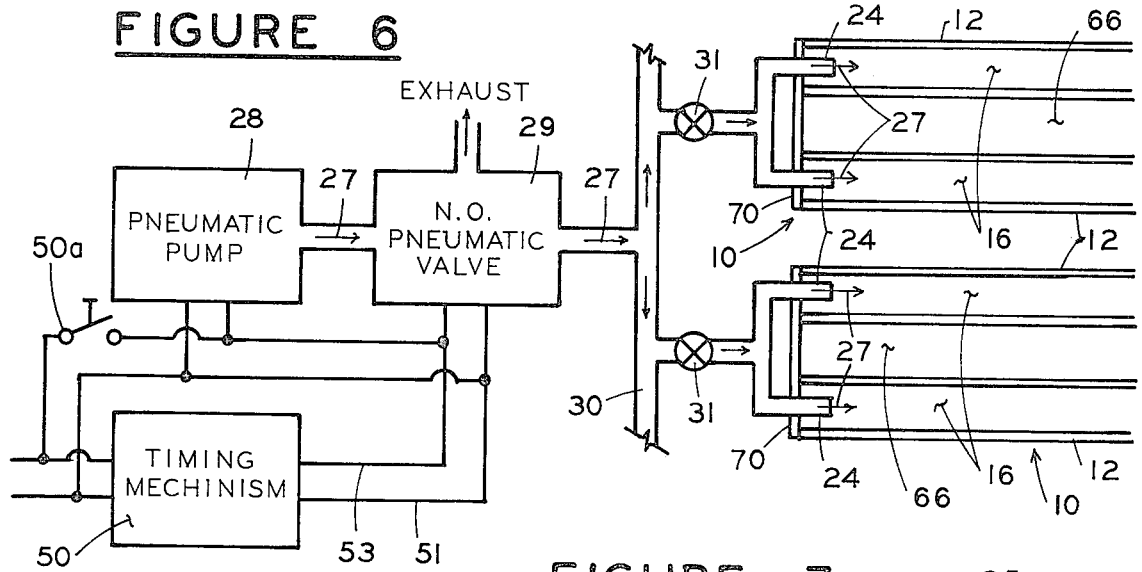
FIG. 6 is a schematic of the pneumatic system.

In FIG. 6, a remotely operated timing mechanism 50 may be used to systematically actuate the pneumatic pump 28, while closing the normally open pneumatic valve 29, to actuate the liquid supply cycle for a predetermined duration. Upon completion of the liquid supply cycle, the remotely operated timing mechanism 50 deactuates the pneumatic pump 28 and pneumatic valve 29 opens to expel pneumatic pressure from the system.

To manually operate the pneumatic pump 28, a switch 50a may be included with or in place of the remotely operated timing mechanism 50. The switch 50a actuates the pneumatic pump 28 and closes pneumatic valve 29.

The level 20 of liquid 14, prior to displacement, is maintained either by visibly filling open container 12 with liquid 14 to level 20, (FIG. 3), or by a remotely controlled level sensing device 33 (FIG. 7), which actuates a liquid pump 34 on demand. The liquid pump 34 is connected to a water supply 36, and may include a means of proportioning nutrient solution 38, into the liquid prior to its entry through fluid lines 40 to open container 12. The liquid pump 34 may supply more than one growing system 10 with liquid 14.

Normally, the liquid supply cycle is actuated one to four times a day for a duration of 10 to 30 minutes per cycle, depending on plant requirements.

Figure 9:
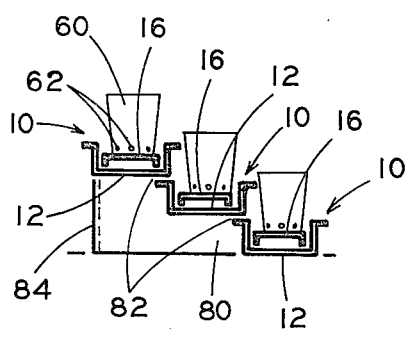
FIGS. 9–10 are sectional views of staggered growing systems.
Figure 10:
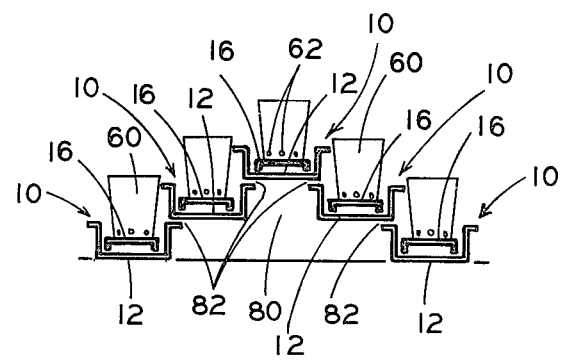
Figure 11:
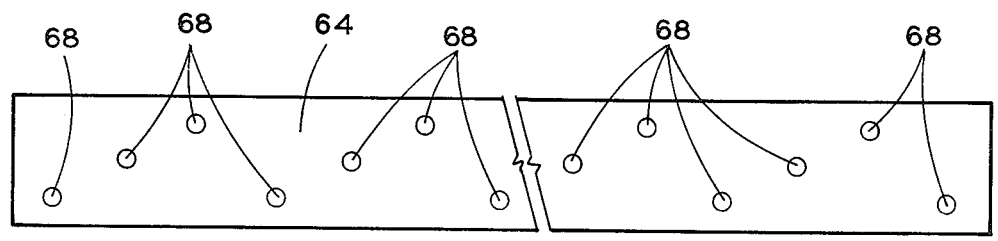
FIG. 11 is a detail view of the perforated sheet used between growing systems to direct the flow of air around and through the plants.

Means for removing liquid 14 from the open containers 12 is provided upon completion of the useful life of the liquid 14 (liquid may be pumped, siphoned or drained from open containers 12). Normally, liquid 14 is replaced every 7 to 21 days, at which time liquid 14 is replenished. Liquid is removed through openings 61 in open containers 12 (FIG. 5). Openings 61 may be interconnected by fluid line 63 and controlled or drained by a manually operated fluid valve 65. When openings 61 are interconnected by fluid line 63, all liquid 14 in a level system will be self-leveling, requiring only one liquid level sensor 33 for the entire system. When growing systems 10 are staggered as shown in FIGS. 9, 10, individual manual or automatic level controls must be used on each growing system 10, and drains individually controlled.

The growing systems 10 may be placed in a side-by-side relation, as shown in FIG. 1, or spaced apart for larger plant growth, such as tomatoes. A perforated sheet of material such as cloth, plastic, or metal 64, may be secured to the sides of the open containers 12 to form an enclosure 66 (FIG. 2) between the growing systems 10. The addition of forced air from an external heating or ventilating system (not shown) to enclosure 66 will force air through the perforations 68 in sheet 64 along the entire length of the growing system 10, providing air movement around and through the plants located on plant support 16.

The total area of the openings 68 is less than the cross-sectional area of the opening 75 so as to maintain a slight superatmospheric pressure within chamber 66 and this is to provide a slight but constant draft of outlet air for each opening 68. It is well known by those skilled in the art that gentle air movement around and through a plant aids plant transpiration, reducing the dangers of fungus and mold diseases in a greenhouse environment.

Figure 12:
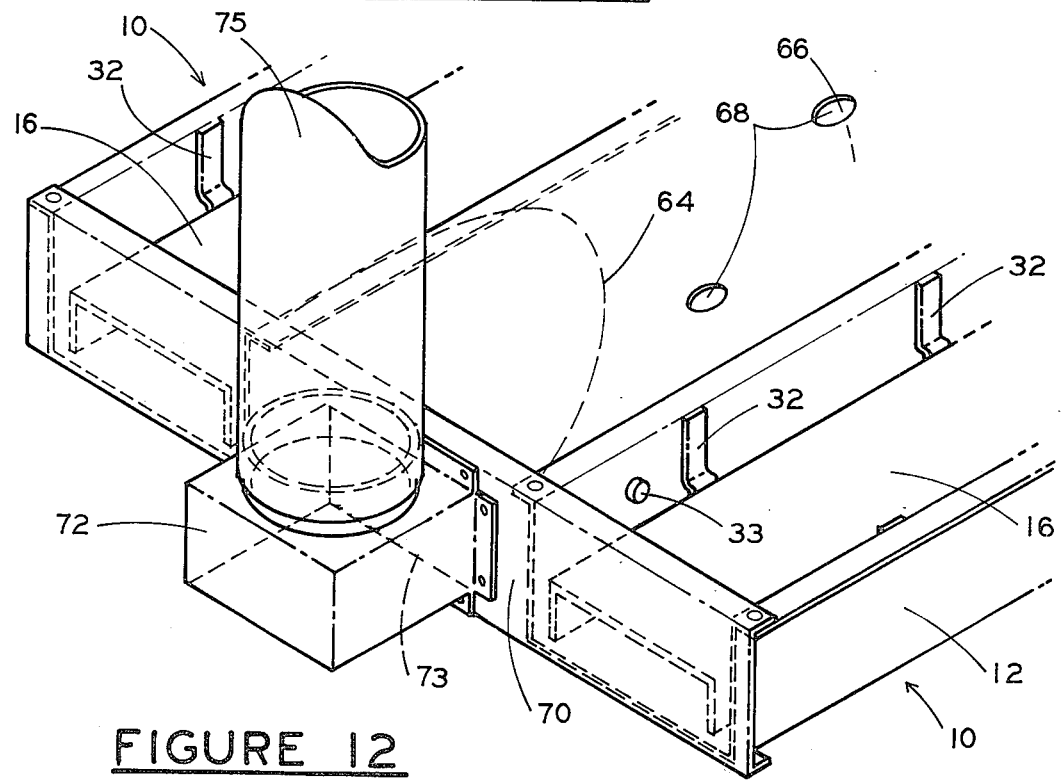
FIG. 12 is a detail isometric view of one end of the side-by-side growing systems, showing a duct attached to the end of the growing systems to receive forced-air for circulation around and through the plants.

Ends 70 and the flange 69 of container 12 serve to provide a means to secure sheet 64 to form the enclosure 66. The ends also provide a convenient place to mount a duct 72 to one end (FIG. 12). The duct 72 may be turned to receive forced air from above or below. An opening 73 allows forced air to enter enclosure 66 from duct 72. A clear plastic tube or conventional heating duct may be used to connect duct 72 to conventional heating and/or ventilating system (not shown).

The growing systems 10 also lend themselves to other configurations, such as staggering the heights of several growing systems 10, as shown in FIGS. 9,10. This allows maximum use of growing space for smaller plants; allows use of individual containers for each plant; provides a variety of spacing to suit changing needs; and, supplies bottom watering of enriched liquid to plants for increased growth and yields without modifying growing system(s) 10.

The enclosure 80 formed beneath the growing systems may be advantageously used to provide air movement around and through plants by providing openings 82 between staggered growing system(s) 10.

Staggered growing system(s) 10 as shown in FIG. 9 will require a support 84, to contain forced air in chamber 80. Staggered growing system(s) 10, as shown in FIGS. 9-10 may be placed at floor level for larger plants, or on benches, without affecting operation of the growing systems.

An elongated fluid bag 88 may also be placed within the liquid 14 to displace the liquid when fluid is pumped into the inflated bag 86. The fluid bag takes the place of the chamber 22, and serves to raise the liquid 14 through longitudinal spaced openings 15b, 15c, or 15d, when filled with a gas or liquid. When a gas is used, liquid 14 is lowered from liquid level 21 to liquid level 20 as mentioned previously. Where liquid is used to fill bag to displace liquid 14, a pump must be added to withdraw liquid in the bag to lower liquid 14, for periodic supply of liquid 14 to the root system of plants (FIGS. 13, 14, 16 and 17).

FIG. 17 shows an alternate method of displacing liquid 14. When chamber 22 is filled with fluid, the bladder 88 rises to position 86, displacing liquid 14 through opening 15d to level 21 in each side tray 12. Upon completion of liquid supply cycle, the fluid in chamber 22 is removed, allowing bladder 88 to lower from position 86 so that liquid 14 flows through openings 15d from level 21 to level 20.

OPERATION OF THE INVENTION

In FIG. 6 the growing system 10 remains static until manually actuated or actuated by a remotely operated timing mechanism 50. The timing mechanism 50 actuates a pneumatic pump 28 which supplies pneumatic fluid 26 under pressure through connecting fluid lines 30 to chamber 22; the timing mechanism may also close a normally open pneumatic valve 29 in line 30 between penumatic pump 28 and inlet 24.

In FIGS. 3, 4, the pneumatic fluid 26 under pressure, displaces the liquid 14 within chamber 22, forcing the liquid 14 to flow beneath sides 18 of the plant support 16 through openings 15, hydraulically sweeping the entire bottom of container 12; continuously mixing the nutrient particles that tend to settle on the bottom with the liquid; while raising the level of liquid 14 in the open container 12 from level 20 to level 21. The liquid 14 rises to a level equal to the volume of liquid 14, displaced within chamber 22, which is sized to allow the liquid to rise above the level of the plant support 16 and enter openings 62, provided in the plant containers 60; those openings being located near the periphery of the base of the plant containers 60. This provides for bottom watering by liquid 14 to plant roots, located in containers 60, on plant support 16.

The sides of the open container 12 are of sufficient height to contain the liquid 14 during the liquid supply cycle, and may include a flange 69 to stiffen the open container walls.

After liquid 14 reaches level 21, the pneumatic pump 28 continues to supply pneumatic fluid 26 under pressure during the liquid supply cycle, causing pneumatic fluid 26 to pass beneath sides 18 and bubble through openings 15, acting to agitate the liquid 14 during use. When oxygen is present in the pneumatic fluid 26, such as when pumping air, the oxygen also acts to oxygenate the liquid, which is beneficial to the plant root system.

Under certain conditions it may be desirable to add controlled amounts of carbon dioxide to the pneumatic fluid, which will rise from the liquid in the vicinity of the plants and supply carbon dioxide to plant leaves, which is beneficial to plant growth.

Upon completion of the liquid supply cycle (FIG. 6), the pneumatic pump 28 is turned off and the normally open pneumatic valve 29 is opened. This allows the pneumatic fluid 26 within the chamber 22 to vent through fluid line 30 and is exhausted through pneumatic valve 29, which in turn allows the liquid 14 to gravitate back to chamber 22, lowering the liquid level in the open container 12 from level 21 to level 20 (FIGS. 3, 4). Plant support 16 is now above the liquid level, and the plant roots in their respective plant containers 60 are free to breathe, absorbing oxygen through their root systems for optimum growth because the same openings 62 which accesses nutrients by water phase, then accesses air for gaseous phase aeration.

Every 7 to 21 days it is desirable to replace the liquid 14 in the growing systems 10, which is accomplished by pumping, siphoning, or draining the liquid 14 from the open containers 12. Fresh liquid may then be supplied.

In conventional watering systems the water was introduced at the top of the container and the base of the container included openings for drainage. The drainage openings were ineffective for aeration. Air had to enter from the top of the container and this proved to be ineffective.

In the present invention, however, the liquid phase nutrients are accessed to the plant container 60 from the bottom where the liquid is drawn upward by capillary action. Once the openings 62 are uncovered by the liquid, the same openings become effective for gaseous phase infiltration and serve as effective aeration openings. The same result is unadaptable in the prior art because the descending flow of water displaces the air in the plant container 60 and the plants and root structure have a distinct lack of aeration when over-watering occurs.

Figure 7:
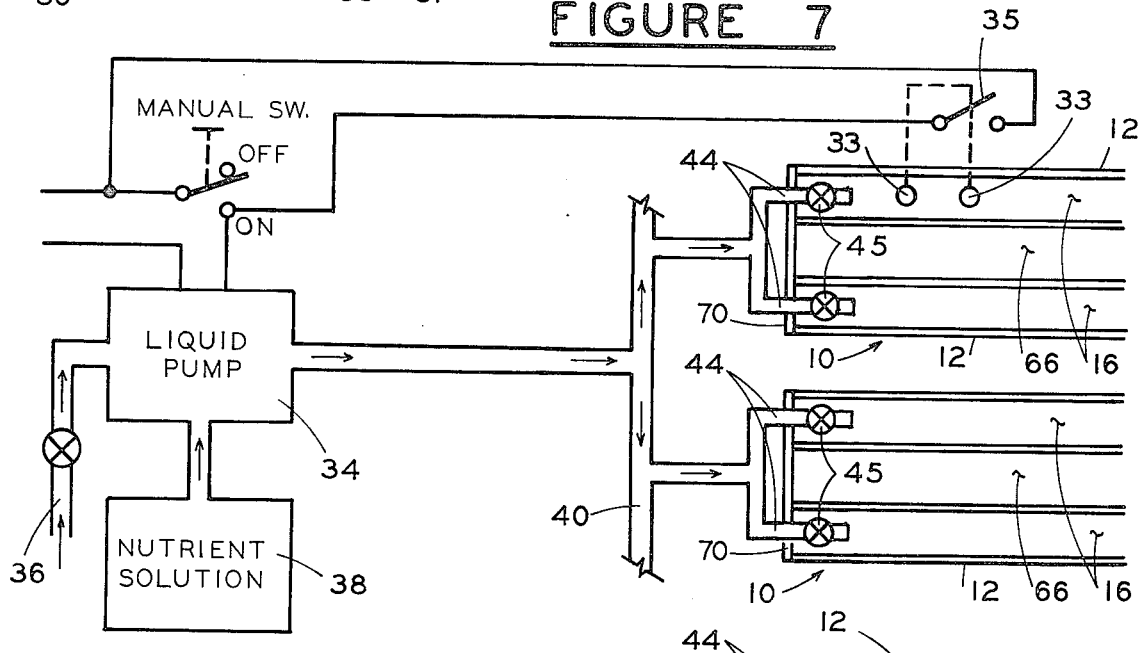
FIG. 7 is a schematic of the automated liquid supply system.
Figure 8:
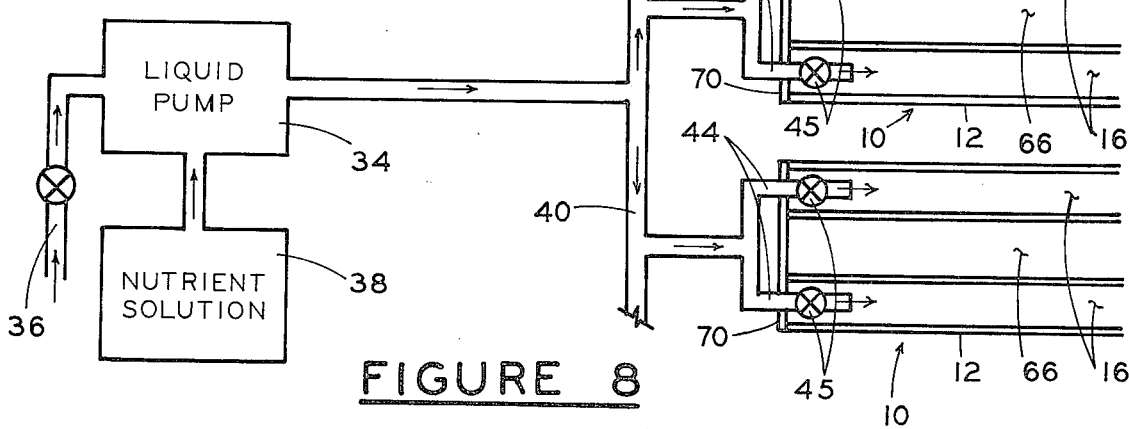
FIG. 8 is a schematic of the manual liquid supply system.

A liquid pump 34 is connected at one end to the water supply 36, and at the other end to the growing system(s) 10. The liquid pump 34 may include a proportioning means, which adds a controlled blend of nutrient solution 38 into the liquid 14 as it is pumped into the growing system(s) 10. The nutrient solution 38 contains a blend of macro and micro nutrients beneficial to plant growth (FIGS. 7,8).

Products such as "BENDMYL", produced by Science Products Co., Inc. of Chicago, Ill. containing methyl-butyl-carbomoyl and benzimidazole carbamate, may be added to the liquid 14 which enters the plant through the root system and is a systemic fungicide for use against such plant diseases as blackspot, gray mold, brown patch, and powdery mildew, on foliage and ornamental plants.

When actuated, the liquid pump 34 supplies the enriched liquid 14 to the growing system(s) 10 through fluid lines 40 to predetermined level 20. This can be done manually (FIG. 8) or automatically (FIG. 7) by means of a liquid level sensor 33 which actuates a switch 35 when liquid level drops below level 20, and deactuates switch 35 when liquid level 20 is reached. Fluid line 40 may include incoming fluid lines 44 with valves 45 to manually control liquid level 20.

Depending on plant use, and the rate of evaporation, the liquid level 20 should be checked daily and additional liquid added as required. The automated system (FIG. 7) automatically maintains liquid level 20, eliminating the need to check the liquid level daily.

FIG. 5 shows a variety of plant spacing possible with growing system(s) 10. In row "A", plant containers are placed side by side, when plants are small. Row "B" shows plant containers both close together and spaced apart. Plants are spaced apart to provide room for large plants, such as tomatoes. Row "C" shows staggering of spaced apart plants to maximize available light to each plant.

Located on row "A" and half of row "B" are sufficient plant containers 60 to use in the remaining rows as they grow larger, allowing for the staggering of plant crops in a minimum of greenhouse space.

Rows "A" through "E", as shown in FIG. 5, will conveniently fill a 30 ft.×100 ft. commercial greenhouse.

This growing system 10 is designed for automatic operation, allowing the operator to spend his time on other tasks. The automated system, as described, requires only periodic checks and occasional maintenance to consistently provide optimum growing conditions within a controlled environment such as that found within an operating greenhouse.

The plant containers 60 are filled with a mixture of materials such as perlite or vermiculite and peat moss or soil, which have excellent liquid retention characteristics, allowing the entire system to go unattended for several days without causing significant damage to plants located upon the growing system(s) 10.

CONCLUSION

The growing system(s) 10, as described, may be fully automated, or manually operated; provides for air movement around and through the growing plants without the use of unsightly air bags suspended from above; allows reuse of the enriched liquid 14; is bottom watering, which reduces dangers of overwatering; eliminates the need for a holding pit; provides for flexibility in plant spacing; and provides for agitation of the liquid 14 during use to insure that the enriched liquid 14 is well mixed during use.

Although the present invention has been illustrated and described in connection with a few selected example embodiments, it will be understood that these are illustrative of the invention and are by no means restrictive thereof. It is reasonable to expect that those skilled in this art can make numerous revisions and adaptations of the invention and it is intended that such revisions and adaptations will be included within the scope of the following claims:

I claim:

1. An apparatus for periodically supplying liquid to the root system of plants utilizing pneumatic pressure which comprises:
   an elongated container for containing a liquid plant nutrient at a first liquid level;
   an elongated planar plant support having longitudinal side edges and upper and lower surfaces positioned and supported in said container above said first level;
   first means for providing an elongated pneumatic chamber beneath said support and having a lower surface defined by this liquid surface at said first level;
   second means for supplying pneumatic pressure within said chamber;
   third means for providing a fluid passage from beneath said first level to above said support along substantially the entire length of said support whereby upon application of pneumatic pressure by said second means within said chamber said liquid will be forced downward by said pressure, lowering the liquid level beneath said first level in said chamber, forcing said liquid through said passage to raise the liquid level in said passage to further comprising a above said support;
   said passage having a longitudinal opening at substantially the level of said support for substantially the entire length of said support.

2. The apparatus of claim 1 including fourth means to provide unrestricted liquid flow paths laterally over said support and between plants on said support whereby said liquid will rise substantially in said paths upon supplying pneumatic pressure in said chamber; and
   a fifth means for providing a liquid opening between said paths to the plant roots of each of the plants on said support whereby the roots of each of said plants are accessed to nutrient liquid upon sustained pneumatic pressure in said chamber.

3. The apparatus of claim 2 wherein said fourth means comprises individual plant containers positioned in spaced relation to one another on said support, the spacing between said container providing said paths;
   said fifth means comprising perforations in said containers to provide said liquid passages to said plant roots.

4. The apparatus of claim 1 wherein said third means comprises a continuous passage opening along substantially the entire length of each longitudinal side of the bottom of said containers,
   whereby during liquid flow in said third means the settled nutrient particles along the entire container bottom will be agitated, and homogeneously mixed in the liquid providing a continuous hydraulic sweeping of substantially the entire container bottom during liquid flow in said third means.

5. The apparatus of claim 1 wherein said third means comprises a continous longitudinal opening at substantially the level of said support for substantially the entire length of said support at each longitudinal edge of said support.

6. The apparatus of claim 5 wherein said first means comprises laterally spaced elongated sides depending from the opposite longitudinal edges of said plant support to form an elongated inverted u-shaped channel;
   said channel being placed in said container and the lower edges of said depending sides being supported in spaced relation above the bottom of said container, to provide first fluid longitudinal continuous clearances along the entire length of said channel sides;
   said support side being laterally spaced from the facing container sides to form there between elongated second clearances for substantially the entire length of said container and support;
   said first and second clearances for each side forming respective first and second fluid passages between said chamber and the upper surface of said support, whereby when said second means applies pneumatic pressure to said chamber, liquid will be forced downward in said inverted channel, through said first clearances, and upward through said second clearances to supply liquid nutrient to the upper surface of said support along the entire length of both longitudinal edges of said support.

7. The apparatus of claim 6 including a plurality of elongated straps, each strap having a lateral offset intermediate of its length;
   said straps being vertically positioned and longitudinally spaced between and attached to each channel side and the facing container side to provide lateral spacing there between to form said second clearances and to support said channel in said container.

8. The apparatus of claim 1 further comprising a perforated sheet forming at least a portion of a second pneumatic chamber attached at a first longitudinal edge of said container;
   said second means adapted to supply pneumatic pressure to said second chamber, causing gaseous flow from said perforations across said plant support.

9. The apparatus of claim 8 including a second elongated container laterally spaced from said first container;

said second container having a second longitudinal edge facing said first edge;

said sheet being attached at said second longitudinal edge.

10. The apparatus of claim 1 further comprising a sixth means for timing the periods that said second means supplies pneumatic pressure to raise and lower the liquid level above and below said support.

11. The apparatus of claim 10 further comprising a seventh means for maintaining the liquid level in said container between periodic pneumatic pressure supply by said second means.

12. The apparatus of claim 11 wherein said seventh means is adapted for proportioning nutrient solution with water.

13. The apparatus of claim 1 further comprising an eighth means for draining the liquid from said container.

14. The apparatus as referred to in claim 1, wherein more than one apparatus is placed side by side at staggered heights with openings provided between the staggered heights of the apparatus, and the space beneath the staggered apparatus is adapted to form an enclosure, and a means is provided to introduce air under pressure into said enclosure, said air under pressure escaping through the openings provided between the staggered heights of the apparatus, providing air movement around and through the plants located on the plant supports within the apparatus, to aid plant transpiration.

15. The apparatus of claim 1 wherein said first means comprises an elongated flexible bag, said second means being pneumatically coupled to said bag to inflate said bag to force said bag against said liquid surface and cause said liquid to flow in said third means to a level above said support.

16. A plurality of apparatus as claimed in claim 1 including a fluid passage that is in fluid communication with each of the plurality of containers at a point below said first liquid level to provide a common liquid level in each of the containers.

* * * * *